US006236186B1

(12) United States Patent
Helton et al.

(10) Patent No.: US 6,236,186 B1
(45) Date of Patent: May 22, 2001

(54) METHOD AND SYSTEM FOR DISCRIMINATING BETWEEN DIFFERENT TYPES OF BATTERIES AND CHARGING THE SAME

(75) Inventors: Patrick Helton, Marysville; David Nierescher, Renton, both of WA (US)

(73) Assignee: Intermec IP, Everett, WA (US)

( * ) Notice: Subject to any disclaimer, the term of this patent is extended or adjusted under 35 U.S.C. 154(b) by 0 days.

(21) Appl. No.: 09/470,818

(22) Filed: Dec. 23, 1999

(51) Int. Cl.[7] .................................................... H01M 10/46

(52) U.S. Cl. ............................................................. 320/106

(58) Field of Search ................................... 320/106, 110, 320/116

(56) References Cited

U.S. PATENT DOCUMENTS 5,844,400 * 12/1998 Ramsier et al. ..................... 320/106

* cited by examiner

Primary Examiner—Edward H. Tso

(57) ABSTRACT

A battery charging system for discriminating between different battery packs and charging the battery packs according to battery type and charging parameters of the battery pack. The battery charging system has a battery having a label and a charging dock for receiving the battery. Charging dock has a label reader for reading the label when the battery pack is operationally coupled to the charging dock. A discriminator, which is coupled to the label reader, generates at least one charge control signal based on information received from the label reader. A charger that is coupled to the discriminator receives the charge control signal and charges the battery pack based on the charge control signal.

16 Claims, 13 Drawing Sheets

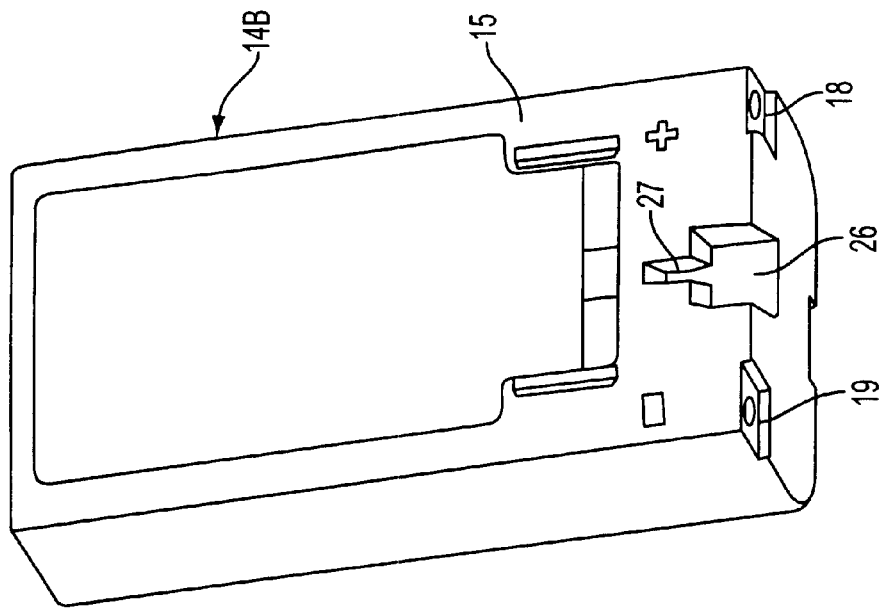
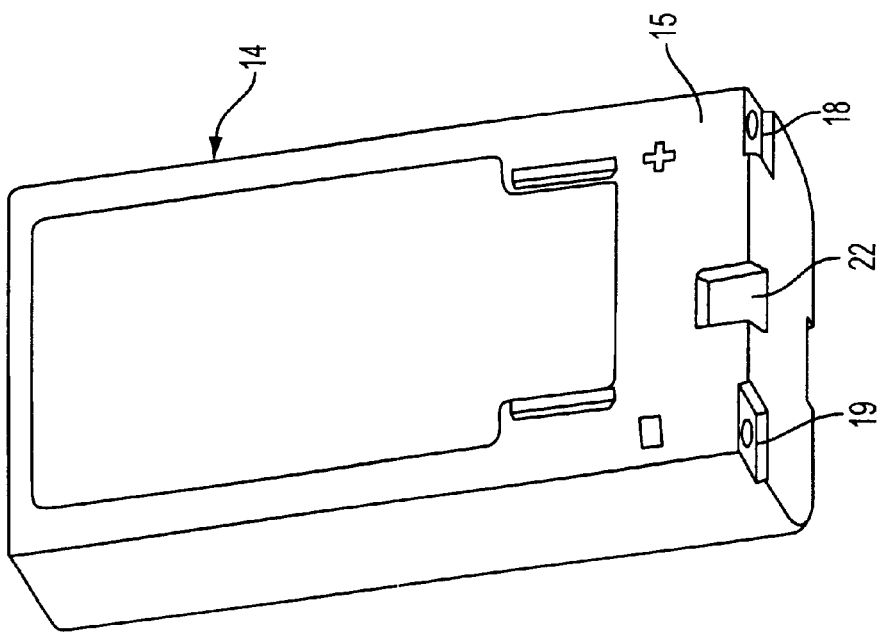
FIG. 4B
FIG. 4A

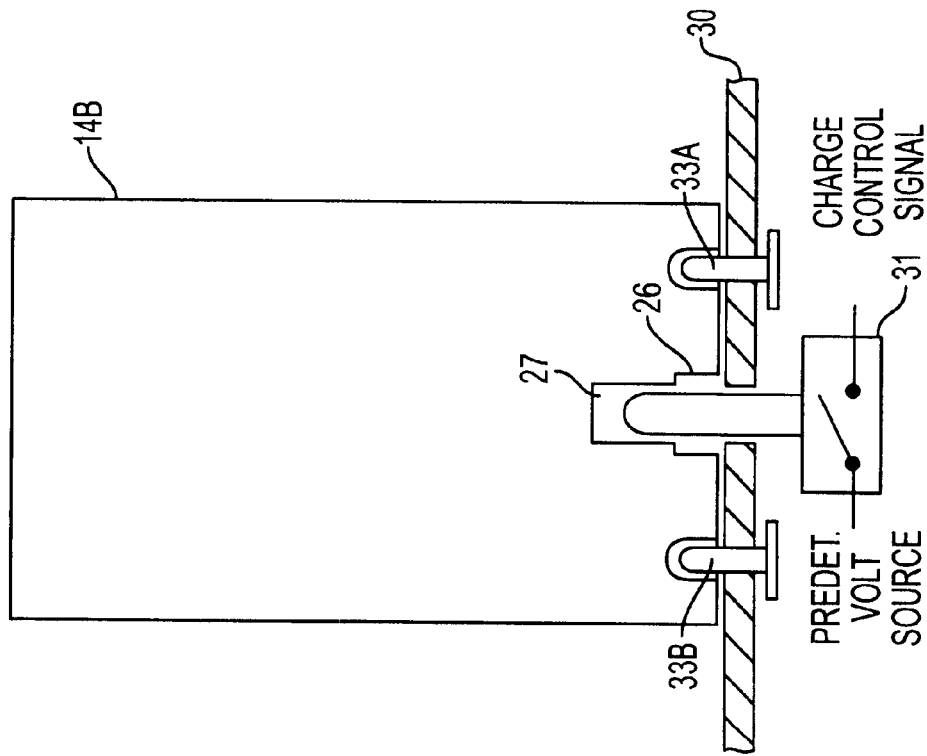
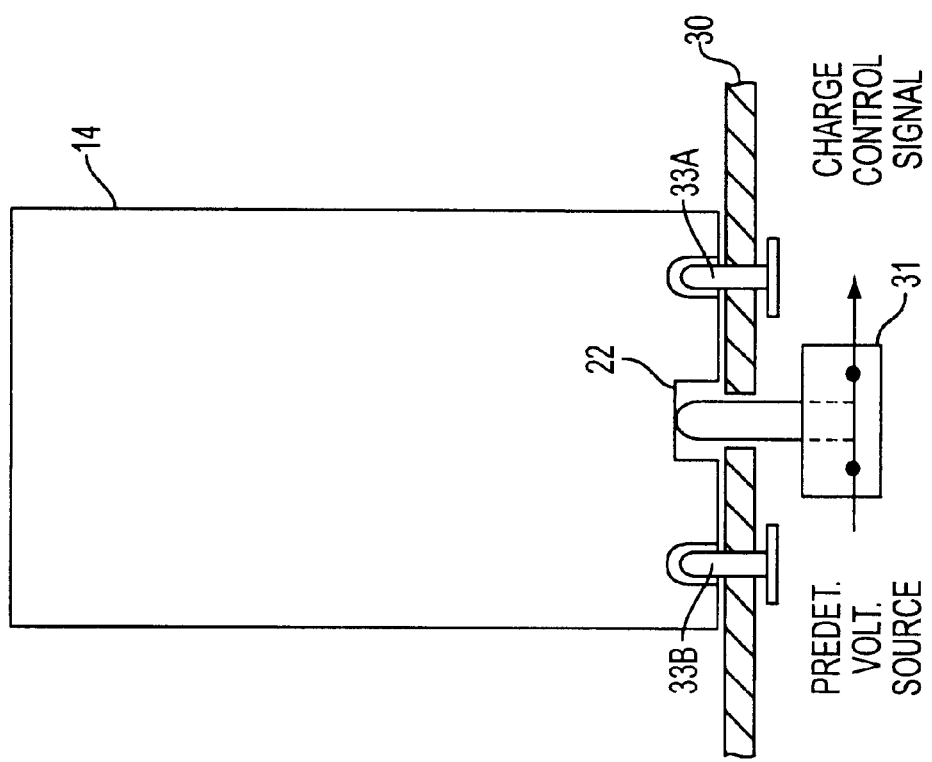

METHOD AND SYSTEM FOR DISCRIMINATING BETWEEN DIFFERENT TYPES OF BATTERIES AND CHARGING THE SAME

BACKGROUND OF THE INVENTION (1) Field of the Invention

The present invention generally relates to battery charging systems. More specifically, the present invention relates to a battery charging system and method for identifying the type of battery pack and charging the battery pack accordingly.

(2) Description of the Related Art

In the past, portable, battery-operated electric and electronic equipment were typically powered by primary batteries which are non-rechargeable batteries that had to be disposed of after a single use. However, as small, maintenance-free rechargeable batteries (also known in the art as "secondary" batteries) have been developed, these secondary batteries have become the battery of choice for many applications. Secondary batteries afford a lower life-cycle cost as they can be recharged and reused and offer the convenience of using a replaceable cell over a one-time-use cell. Secondary batteries are being used in increasing numbers to power portable equipment such as tools, toys, lighting, photographic, radio, and, more significantly, consumer electronic devices such as laptop computers, camcorders, cellular phones, and bar code readers.

Secondary batteries come in different chemistries (e.g., NiCd, Alkaline, Lithium Ion (Li-Ion), Nickel Metal Hydride (NiMH), sizes, and shapes. Different batteries also have different charging parameters. A battery charger which accepts different battery types should adapt its charging parameters in accordance with the battery type detected. However, proper recharging is critical since it is important that the battery not be overcharged or undercharged.

Overcharge can cause the battery to run at high temperatures and rupture, thereby destroying the battery. Further the battery acid and electrolyte that leak can damage the equipment that houses the battery. Lithium based chemistries are particularly sensitive to voltage and so it is important that these batteries be charged with the proper voltage. In extreme cases, the battery can explode causing physical harm. At a minimum, overcharging can greatly shorten the battery life thereby reducing the effective life of the battery.

Undercharge can also shorten the effective life of the battery. The duration of the battery charge is not fully utilized since the amount of charge that can be stored in the battery is not at a maximum capacity.

Prior art battery chargers have the ability to sense the different required charging rates for batteries having different capacities so as to supply the appropriate charge parameters. An example of a battery charging system is one that includes a charger apparatus and a battery which employs a sense resistor, within the battery housing itself. The sense resistor provides an electrical signature indication of battery type and charge state. Based upon the battery type detected, charge control circuitry in the charger apparatus adapts its charging parameters accordingly.

Prior art battery chargers have several drawbacks, however. The resistor within the battery can open or short and the resistive value may change over time, thereby causing erroneous readings. For example, if a resistor value of 1 k is one charge level and 1.1 k is a second charge level, over time, a 1 k resistor can move closer to 1.1 k and a 1.1 k resistor can move closer to 1 k thereby causing incorrect results.

Further, once the resistor value is predetermined or fixed, it is static and cannot be changed. During manufacturing, many options are available to assign different resistor values to different battery types and charge levels. But once the value is set, the battery type cannot be changed. The batteries would need to be recalled by the battery manufacturer and the resistors replaced with new values.

Additionally, several components are required in the prior art battery charging system. A sense resistor is needed in the battery. A third contact terminal for the sense resistor (in addition to the "+" terminal and the "−" terminal) is also required. In addition, circuitry for detecting the resistor must be installed in the battery charger. These additional components all add cost, design, and manufacturing complexity to the overall battery charging system.

Finally, prior art battery chargers are typically designed to charge only new battery types and are generally not compatible with older, previous generation batteries. It would be desirable to have a single battery charger that can accommodate both new and older batteries so that the older batteries do not have to be discarded, space can be saved, and ease of use can be enhanced.

Therefore, it is desirable to provide a simple and cost-efficient battery charger to automatically recognize the battery type which is to be charged and to adapt its charging parameters accordingly.

SUMMARY OF THE INVENTION

It is one object of the present invention to provide a battery charging system which accepts different types of battery packs and adapts its charging parameters according to the battery type detected.

It is another object of the present invention to provide a battery charging system that discriminates between different battery packs and charges the battery packs according to battery type and charging parameters of the battery pack without having to change components internal to the battery packs.

It is another object of the present invention to provide a battery charging system that utilizes labels with information about battery pack type and charging parameters that can easily be affixed to or printed on the external surface of the battery packs.

It is yet another object to provide a battery charging system that is cost effective and reduces the cost to manufacture battery packs.

It is another object provide a battery charging system that can flexibly adapt to and accommodate batteries manufactured before the present invention and those batteries to be manufactured in the future by simply affixing a label and assigning a unique identifier identifying the battery pack type and charging parameters.

The present invention provides a battery charging system for discriminating between different battery packs and for charging the battery packs according to battery type and charging parameters of the battery pack. The battery charging system includes a battery pack having a label affixed thereto and a charging dock for receiving the battery pack. The charging dock has a label reader for reading the label when the battery pack is operationally coupled to the charging dock. A discriminator, which is coupled to the label reader, generates at least one charge control signal based on information received from the label reader. A charger that is coupled to the discriminator receives the charge control signal and charges the battery pack based on the charge control signal.

In one embodiment, the present invention provides a method to charge battery packs that can include the following steps: (1) a user inserts a battery pack having a label into the charging dock, thereby placing the label in physical proximity to label reader; 2) label reader reads information from the label and provides the information to discriminator; 3) the discriminator identifies the battery pack and the appropriate charging parameters and generates at least one charge control signal based on the received information; 4) the charger charges the battery pack based on the received charge control signal.

BRIEF DESCRIPTION OF THE DRAWINGS

The features, aspects, and advantages of the present invention will become more fully apparent from the following detailed description, appended claims, and accompanying drawings.

FIGS. 4A and 4B illustrate battery packs having different physical keys that can be used with the charging system of FIGS. 1 and 2.

FIGS. 5A and 5B illustrate cross-sectional views of a charging bay that is operationally coupled to the battery packs of FIGS. 4A and 4B, respectively and that is configured to distinguish between the battery packs based on the physical key.

DETAILED DESCRIPTION OF THE INVENTION

Figure 1:
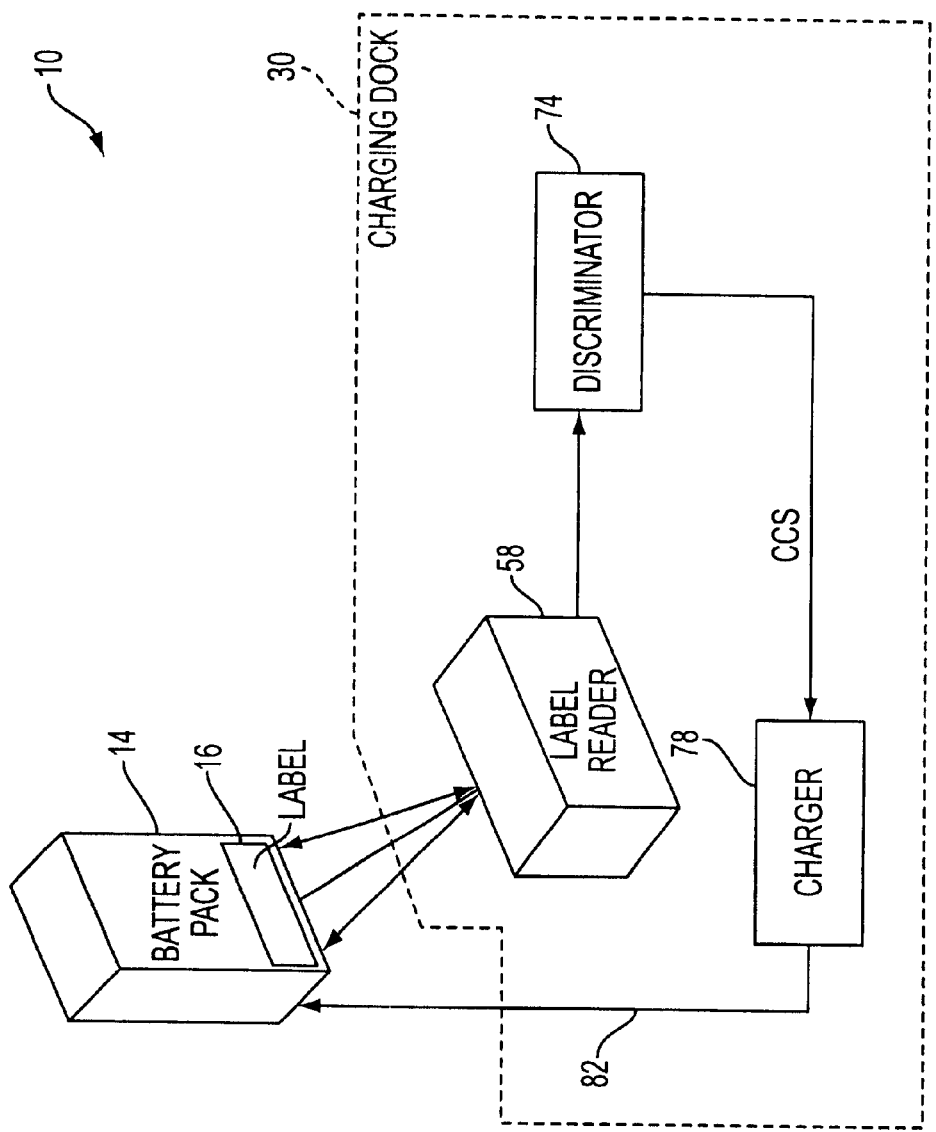
FIG. 1 is a block diagram of a battery charging system configured in accordance with one embodiment of the present invention.

In the following description, numerous specific details are set forth to provide a thorough understanding of the present invention. However, one having an ordinary skill in the art will recognize that the invention can be practiced without these specific details. In some instances, well-known electronic building blocks, electronic devices and circuits have not been shown in detail to avoid unnecessarily obscuring the present invention.

Battery Charging Systems

The present invention provides a battery charging system 10 for discriminating between different battery packs 14 and for charging the battery packs 14 according to the battery pack type and the charging parameters of the battery pack 14. The battery charging system 10 can include a battery pack 14 with a label 16 affixed thereto, and a charging dock 30 for receiving the battery pack 14.

The term label as used herein refers to any identifier that specifies information about the battery pack. The identifier can be a separate piece (e.g., a physical label) that is physically attached or affixed to the battery pack 14. Alternatively, the identifier can be formed integrally with the housing of the battery pack. For example, a co-molding process (also referred to as a "two-shot" molding process), which uses two plastics of different colors, can be utilized to imprint battery information onto the plastic housing of the battery pack. Also, the identifier can be printed directly onto the housing of the battery pack by utilizing conventional ink-jet or laser printing techniques.

The term "battery pack" as used herein refers to one or more batteries in their respective packages, or two or more batteries that are bundled into a single package.

Figure 8:
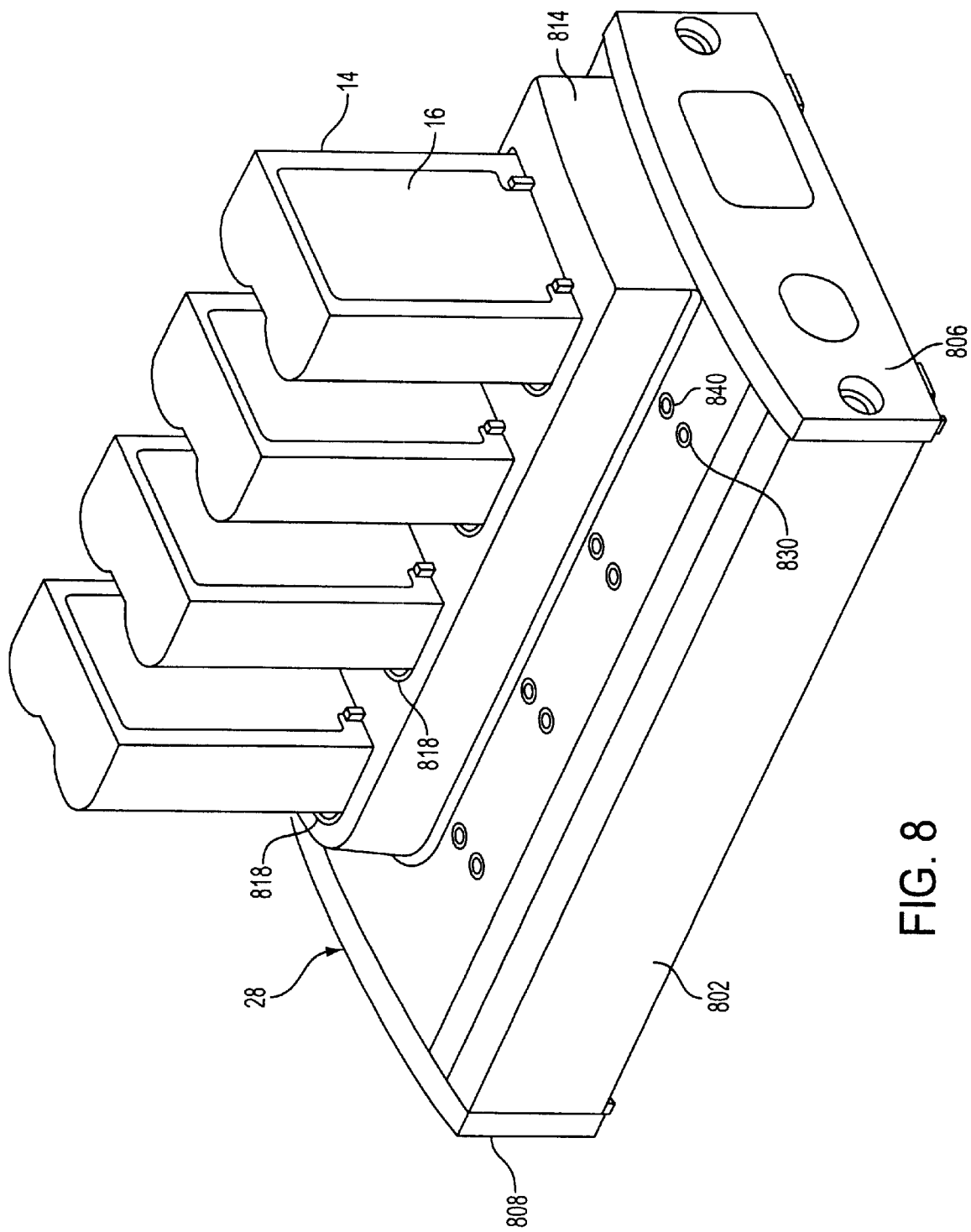
FIG. 8 shows a perspective view of a group of batteries with labels stationed in a battery charger that can be used to implement the charging systems of FIGS. 1 and 2.
Figure 9:
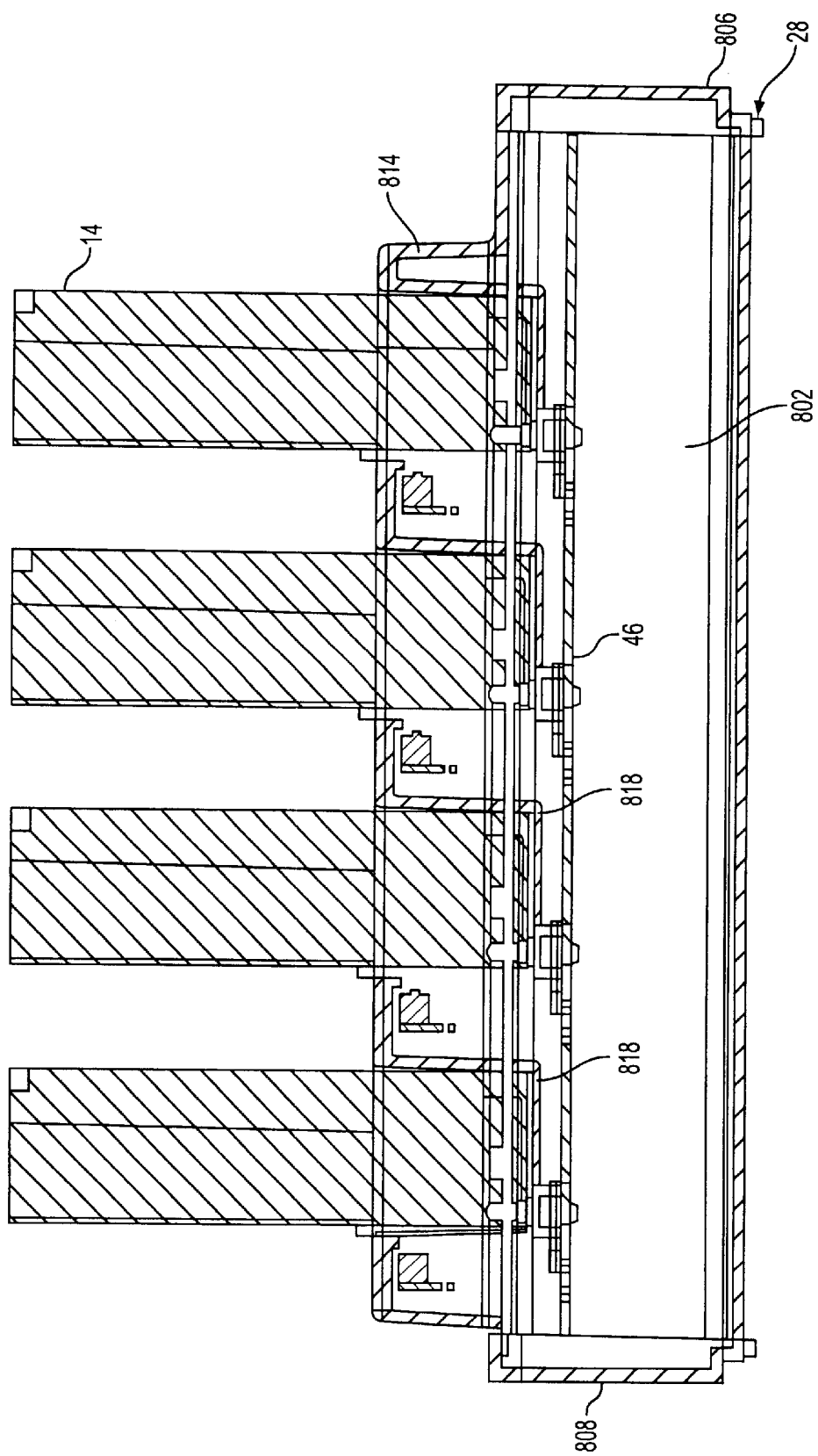
FIG. 9 shows a cross-sectional view of the batteries and battery charger of FIG. 8.

The term "charging dock" or "charging bay" as used herein refers to mechanical and electrical components that are for receiving and charging a battery pack 14. FIGS. 8 and 9 illustrate a charger housing 28 that includes four separate charging docks, such as charging dock 30, where each charging dock 30 is configured to receive a respective battery pack. It is noted that battery charging system 10 can be configured to have fewer or more charging docks or bays than that shown in FIGS. 8 and 9 so that a predetermined maximum number of battery packs can be charged at the same time.

Charging dock 30 has a label reader 58 for reading a label 16 when the battery pack 14 is operationally coupled to the charging dock 30. A discriminator 74, which is coupled to label reader 58, generates at least one charge control signal (CCS) based on information received from label reader 58. A charger 78 that is coupled to discriminator 74 receives the charge control signal (CCS) and charges battery pack 14 based on the charge control signal (CCS).

The charge control signal (CCS) directs charger 78 concerning how to charge battery pack 14 and when to terminate charging. Charge termination can be based on any one or a combination of parameters. For example, charging characteristics or parameters that are associated with a battery pack can include, but are not limited to, charge rate, charge voltage, charge current, maximum temperature, maximum time, maximum voltage (also referred to as "termination voltage"), and change in voltage. Accordingly, the present invention can utilize one or more of these parameters to determine when charging is to terminate. Furthermore, one or more of these parameters can be encoded in the label 16 so that the parameters can be used by the charging dock 30 to charge the battery pack 14 in accordance with battery pack type and charging parameters.

In operation, the following steps can be followed: (1) a user inserts the battery pack 14 having a label 16 into the charging dock 30, thereby placing label 16 in physical proximity to label reader 58; (2) label reader 58 then reads information from the label 16 and provides the information to discriminator 74; (3) discriminator 74 identifies battery pack 14 and the appropriate charging parameters, and generates at least one charge control signal (CCS) based on the received information; and 4) the charger 78 charges the battery pack 14 based on the received charge control signal (CCS).

Figure 2:
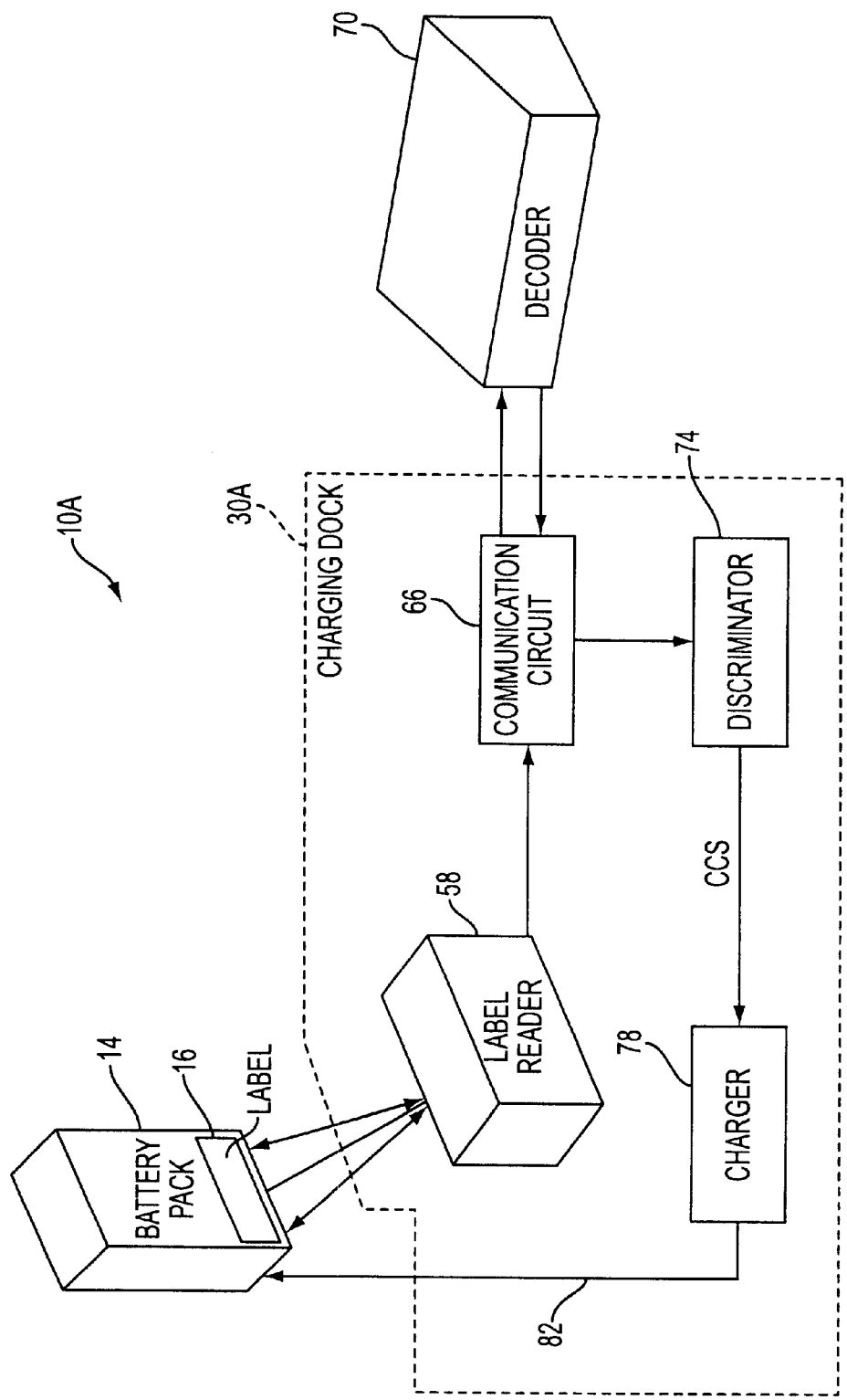
FIG. 2 is a block diagram of a battery charging system configured in accordance with an alternative embodiment of the present invention.

FIG. 2 is a block diagram of a battery charging system 10A configured in accordance with an alternative embodiment of the present invention. In this embodiment, the decoding function can be de-coupled from discriminator 74 into a separate decoder 70 which can be housed in charger housing 28 or separate from charger housing 28. Additionally, a communication circuit 66 is provided to communicate information between charging dock 30 and decoder 70.

Within charging dock 30 is found label reader 58, communication device 66, decoder device 70, discriminator 74, and charger 78. As those skilled in the art will appreciate, such devices and circuit implementations are well-known and are not described here in detail. Additional circuitry may also be included without departing from the spirit and scope of the present invention.

The battery pack 14 having label 16 is shown interfacing with label reader 58. Label reader 58 reads the data from label 16 for selecting one of at least two batteries in accordance with the data when battery pack 14 is coupled to charging dock 30.

Communication circuit 66 is coupled to label reader 58 for receiving the data. Communication circuit 66 can be an integrated circuit that is adapted to communicate data based on a bus protocol, such as the RS 232, RS 488, or IRDA communication protocols. Communication circuit 66 then transmits the data to decoder 70 which then decodes the data by utilizing well-known techniques, such as a look-up table. Upon receipt of the decoded data from decoder 70, communication circuit 66 then transmits the decoded data to discriminator 74. Discriminator 74 generates and provides at least one charge control signal to charger 78 which affects and varies the battery charging parameters based on the charge control signal.

Figure 14:
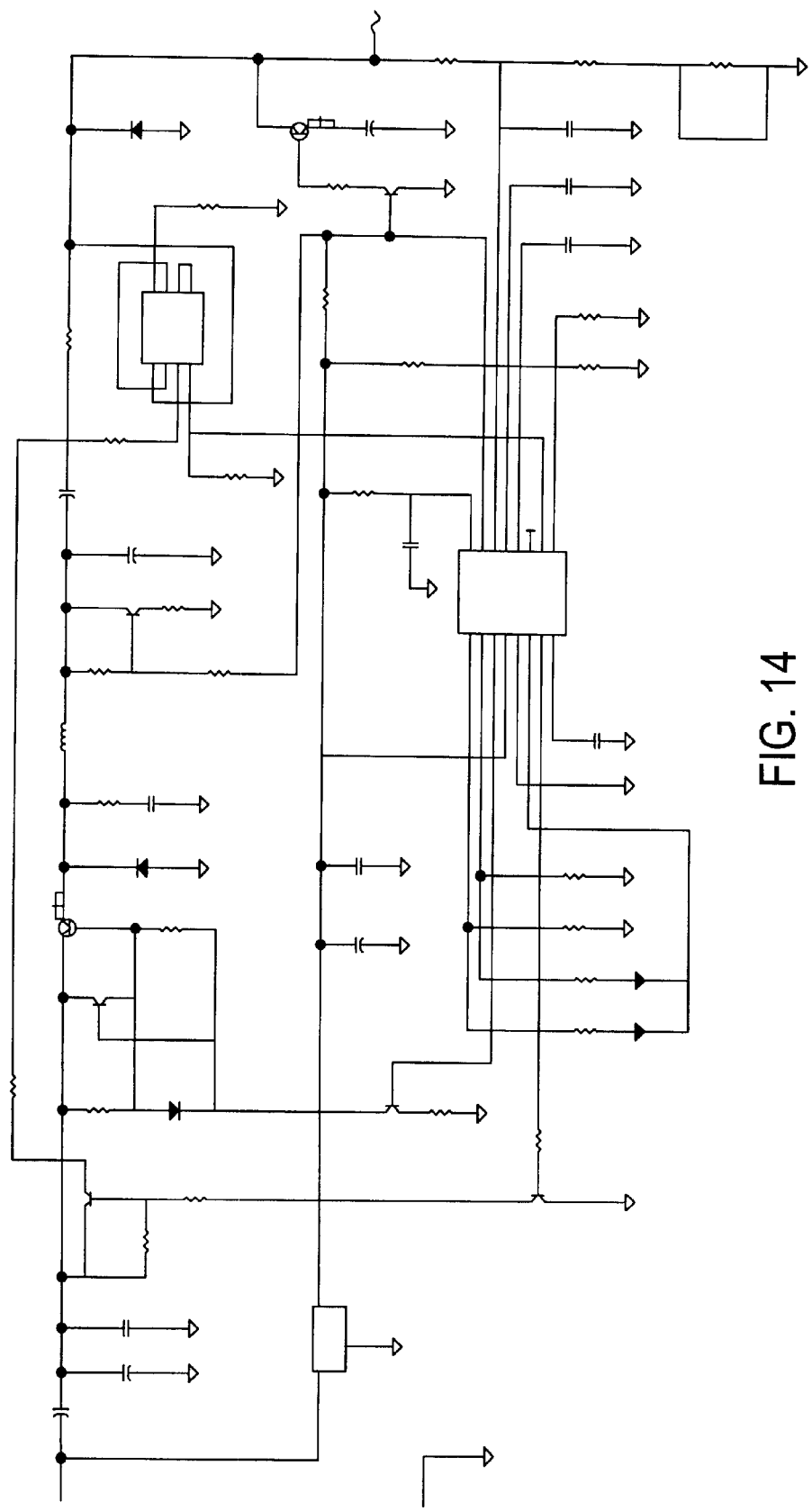
FIG. 14 is a circuit diagram illustrating in greater detail the charger of FIG. 12.

Charger 78 can include integrated circuits and electronic elements and can be implemented in a variety of ways, non-limiting examples of which are described in greater detail hereinafter with reference to FIGS. 12 and 14. In one non-limiting example, the charger 78 has an upper voltage limit of 8.20+0.00/−0.03 volts for the 063278 type battery packs and 8.40+0.00/−0.03 volts for the 068537 type battery packs when in the constant voltage charge mode. The charge current upper limit is set at a rate of 1.0 C for 1500 mA-Hr cells, or 1.50+/− (TBD) amps. This charge limit is the same for either the 063278 or 068537 battery packs.

Preferably, charger 78 has a current limiting feature to prevent drawing more current than the maximum current (e.g., 1.7 A) provided by the power supply. Under optimum "room temperature" charge conditions, with a single, fully discharged battery pack, charger 78 is capable of fully charging the pack in no more than two hours. When more than one pack is in the battery charger, no charging bay has charging priority. Furthermore, when more than one pack is charging, charge times increase since the power supply provides a fixed amount of charge current (e.g., 1700 mA). A fully depleted battery pack may draw the full charge current (e.g., 1500 mA) for a period of time. In this situation, all packs being charged are affected, and no one charger bay has preference for fast charging.

Discriminator 74 generates at least one charge control signal (CCS) based on the information read from label 16. The charge control signal (CCS) causes charger 78 to vary one or more charging parameters. Charger 78 then charges battery pack 14 in accordance with these parameters, which can include, but are not limited to charge voltage, charge current, battery temperature, charge duration, charge capacity, charging methods, or a combination thereof.

The embodiment illustrated in FIG. 2 is especially advantageous when the amount of information read from label 16 is large or the decoding of the information is complex. For example, the magnetic strip embodiment, the bar code embodiment, and the RF embodiment (all of which are described herein below) can be efficiently implemented with the system 10A shown in FIG. 2.

Figure 6:
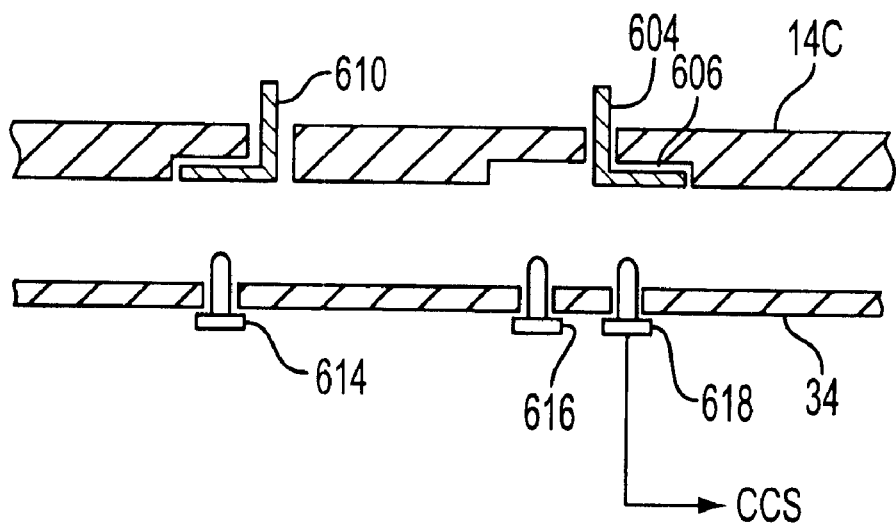
FIGS. 6 and 7 illustrate cross-sectional views of a charging bay that is operationally coupled to battery packs with different terminal locations and that is configured to distinguish between the battery packs based on the terminal locations.
Figure 7:
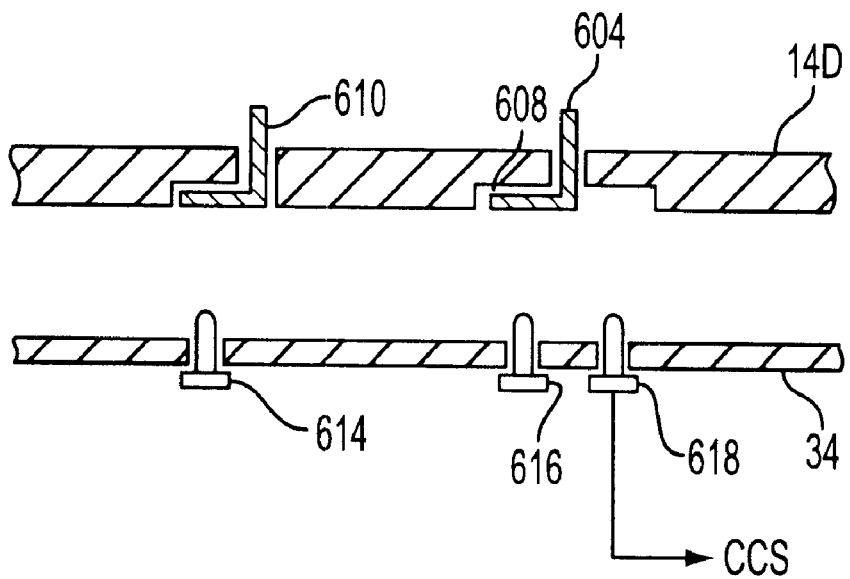

FIGS. 3–7 illustrate different techniques for distinguishing between different battery packs 14. For example, physical differences, differences in location of the terminals, and other techniques are utilized by the present invention to provide information to charging dock 30 regarding the charging parameters associated with that specific battery pack 14. FIGS. 4 and 5 illustrate an embodiment of the present invention that utilizes differences in physical features in the housing of battery pack 14 to differentiate between different battery packs 14. FIGS. 6 and 7 illustrate another embodiment of the present invention that utilizes differences in placement of terminals of battery pack 14 to differentiate between different battery packs 14.

Battery Pack 14 With Label 16

Figure 3:
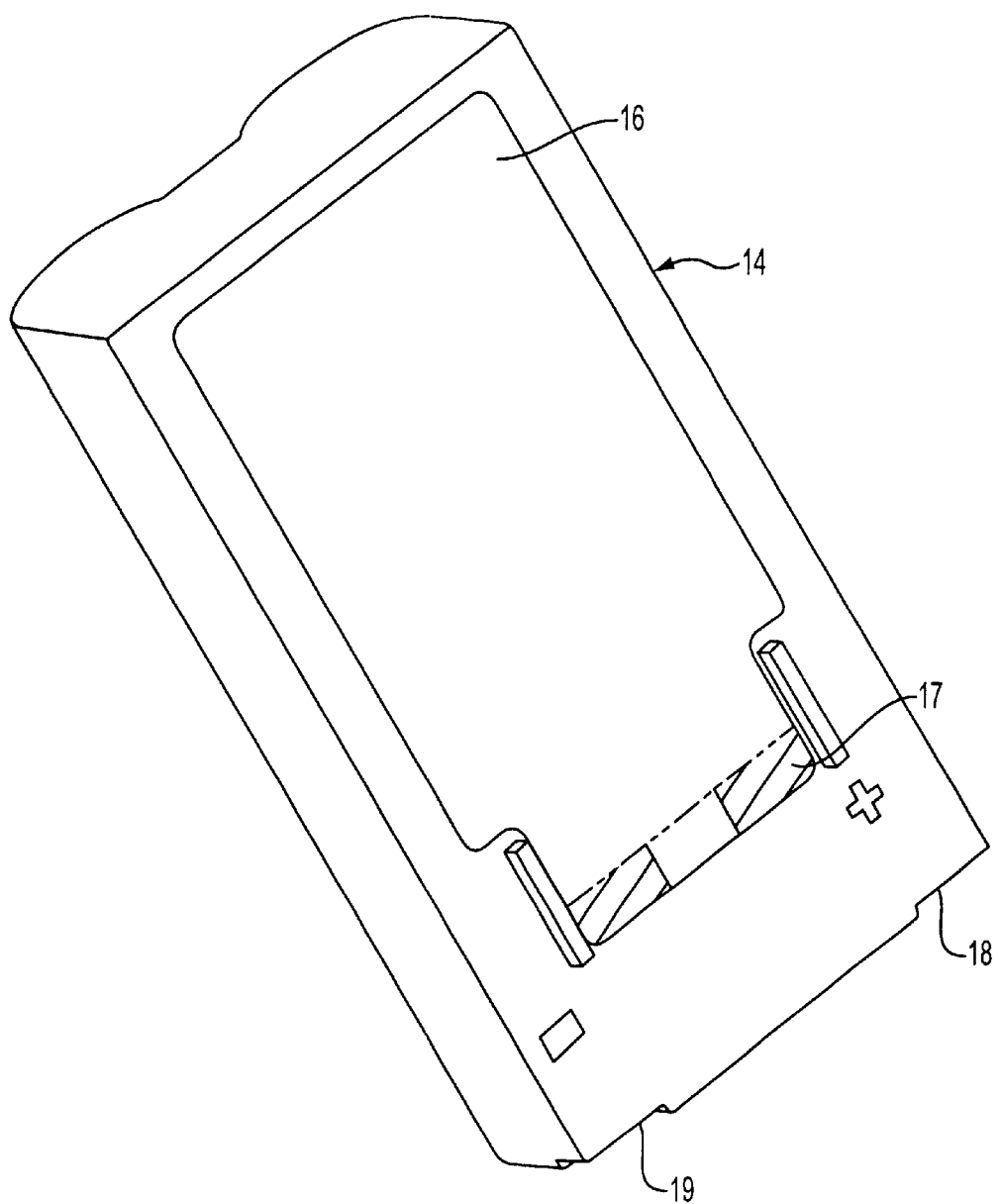
FIG. 3 illustrates a battery pack with a label according to a reflective strip embodiment of the present invention.

FIG. 3 shows a battery pack 14 having a label 16 configured in accordance with one embodiment of the present invention. In this embodiment, label 16 includes a reflective strip 17 having light or reflective areas and dark or non-reflective areas. Label 16 can be affixed to battery pack 16, by adhesive, for instance, such that label reader 58 of charging dock 30 is able to read information or data from reflective strip 17. Alternatively, the label 16 can include light and dark areas of the strip that are imprinted directly onto the housing of the battery pack 16 by utilizing conventional printing techniques or can be formed integrally with the housing by utilizing a co-molding process with two plastics of different colors.

In this embodiment, battery pack 14 is a pack for holding rechargeable Li-Ion batteries and can be a 068537 battery pack available from Intermec Technologies, Inc. Reflective strip 17 comprises three separate sections of reflectivity where each section is either reflective or non-reflective. In this example, eight different batteries may be identified by encoding the sections of reflective strip 17 differently (i.e., the three sections of reflectivity or non-reflectivity can be selectively predetermined to either be black or white to represent $2^3$ or 8 different combinations). It is to be appreciated that reflective strip 17 can have fewer or more than three sections of reflectivity and non-reflectivity depending on the number of different battery types to be identified. In this embodiment, battery pack 14 is a 068537 battery pack having a maximum charge voltage of 8.4V and charge duration of approximately two hours.

In alternative embodiments, label 16 can include a magnetic strip, an RF tag, or a bar code. The functionality of these specific labels in conjunction with their use in the battery charging system will be explained further below.

Battery pack 14 also includes two terminals 18, 19: a "+" terminal and a terminal for use in charging and discharging battery pack 14. When battery pack 14 is inserted into charging dock 30, terminals 18 are placed into electrical contact with associated terminals of charger 78. It is noted that battery pack 14 of the present invention only requires two terminals and that a third contact point for a sense resistor, which the prior art approaches required, is not needed by the present invention.

First Mechanical Key Embodiment

FIGS. 4A, 4B, 5A, and 5B illustrate a first mechanical key embodiment that utilizes different indentations on the outer surface of the battery pack housing to differentiate between different battery packs. Specifically, FIGS. 4A and 4B illustrate battery packs having different physical keys that can be used with the charging system of FIGS. 1 and 2. FIGS. 5A and 5B illustrates cross-sectional views of the battery packs of FIGS. 4A and 4B, respectively, operationally coupled to a charging dock 30.

FIG. 4A shows a battery pack 14 having a physical key 22 with a first shape or configuration. Referring to FIG. 5A, the physical key 22 is adapted to toggle a switch 31 (e.g., a plunger-type switch) mounted within the charging dock 30. When activated or closed, switch 31 generates a charge control signal at a first predetermined voltage level (e.g., a predetermined voltage level provided by a predetermined voltage source 32). When inactivated or open, the switch 31 generates a charge control signal at a second predetermined voltage level that is different from the first predetermined voltage level.

The physical key 22 is fabricated as shown so that when battery pack 14 is inserted into charging dock 30, the switch 31 closes to provide at least one charge control signal to charger 78. Charger 78 can then utilize the control signal to vary or otherwise adjust the charging parameters to suit the particular battery pack being charged.

FIG. 4B shows a battery pack 14B having a physical key 26 with a second shape or configuration that is different from the first configuration. Referring to FIG. 5B, the physical key 26 includes an extra groove 27 that can allow a mechanical switch, mounted in charging dock 30, to remain open or inactivated. When the battery pack 14B is inserted into charging dock 30, the switch 31 remains open, thereby generating a different control signal than the signal generated when the battery pack 14 of FIG. 4A is inserted in charging dock 30. The generated charge control signal is then provided to charger 78. Charger 78 can then utilize the control signal to vary or otherwise adjust the charging parameters to suit the particular battery pack being charged.

Referring again to FIGS. 5A and 5B, when the battery pack 14 or 14B are inserted, the positive terminal 18 and the negative terminal 19 of the battery pack 14, 14B are in contact with a positive terminal 33A and a negative terminal 33B of the charging dock 30.

It is to be appreciated that numerous other types of physical key configurations and different types of mechanical or electrical switches can be employed such that each distinct key and switch combination may be utilized to represent a different battery type without departing from the spirit and scope of the present invention.

Second Mechanical Key Embodiment

FIG. 6 and FIG. 7 illustrate a second mechanical key embodiment that utilizes the placement of the contact terminals of the battery pack to differentiate between different battery packs. In this embodiment, the positive (+) terminal 610 is in a fixed location and electrically couples to a first terminal 614 of the charging bay 34, and the negative (−) terminal 604 can be in one of two positions and electrically couples to either a second terminal 616 or a third terminal 618 depending on the position of the negative terminal 604. The position of the negative terminal 604 is used to differentiate between two different types of battery packs 14C and 14D by sensing current drain. FIG. 6 shows a cross-sectional view of a charging bay 34 operationally coupled to a battery pack 14C with its negative terminal 604 in a first position 606. Thus, when battery pack 14C is fully inserted into charging bay 34, the negative terminal 604 electrically contacts the third terminal 618 of the charging bay 34, thereby changing the voltage at the third terminal 618 to a first predetermined voltage while not affecting the voltage at the second terminal 616.

FIG. 7 shows a sectional view of the charging bay 34 operationally coupled to a battery pack 14D with its negative terminal 604 in a second position 608. When the battery pack 14D is fully inserted, the negative terminal 604 electrically contacts the second terminal 616, thereby setting the voltage at the second terminal 616 to a second predetermined voltage while not affecting the voltage at the third terminal 618. Accordingly, the voltage at the second or third terminal 616, 618 can be utilized as a charge control signal (CCS) and provided to the charger 78 to specify the type of battery pack 14 and the corresponding charging parameters.

Charger Housing

FIG. 8 is a perspective view a charger housing 28 that is configured in accordance with one embodiment of the present invention. The charger housing 28 includes a main body 802 for housing the charging dock 30 electronics and power supply electronics. The main body 802 can be in the shape of a generally rectangular box and can be manufactured as a single piece from a relatively rigid material, such as plastic, by an extrusion process. The charger housing 28 also includes a first end cap 806 and a second end cap 808 for enclosing the opposite ends of the main body 802. The charger housing 28 also includes a raised battery pack receiving portion 814 that defines a plurality of battery pack receptacles 818 for receiving battery packs 14. Two diodes 830, 840 of different colors are also provided for each receptacle 818 to notify the user when charging is complete.

In this embodiment, the charger housing 28 includes a plurality of battery pack receptacles 818 for receiving up to four battery packs (e.g., battery pack 14) simultaneously. Each receptacle 818 has associated therewith a respective charging dock (e.g., the electronics corresponding to charging dock 30 or 30A).

It is noted that although the charging dock 30 or 30A of the present invention is adapted to re-charge secondary batteries or rechargeable batteries that can then be utilized in electrical equipment, such as portable equipment and electronic devices, the charging dock 30 or 30A of the present invention can also be integrated with and implemented as part of the electrical equipment.

The charging dock 30 or 30A of the present invention can be configured to discriminate only between two types of battery packs 14. For example, charging dock 30 or 30A can be configured to charge the following two specific types of rechargeable battery packs: dual cell Li-Ion battery pack (part no. 068537) and dual cell Li-Ion (part no. 063278) available from Intermec Technologies Corporation of Everett, Washington. In this configuration, charging dock 30, 30A discriminates between the two battery packs by utilizing the reflective (white) and non-reflective (black) sections of the label 16.

FIG. 9 shows a cross-sectional view of the charger housing 28 of FIG. 8. Upon insertion of battery pack 14 into receptacle 818, the terminals 18, 19 of battery pack 14 make electrical contact with the terminals 33A, 33B (as shown in FIGS. 5A and 5B) that are disposed on a printed circuit board assembly (PCBA) 46. PCBA 46, power supply, and terminals 33A, 33B are housed in main body 802 50. Electrical power is supplied to charging dock 30 via a power cable (not shown).

Figure 10:
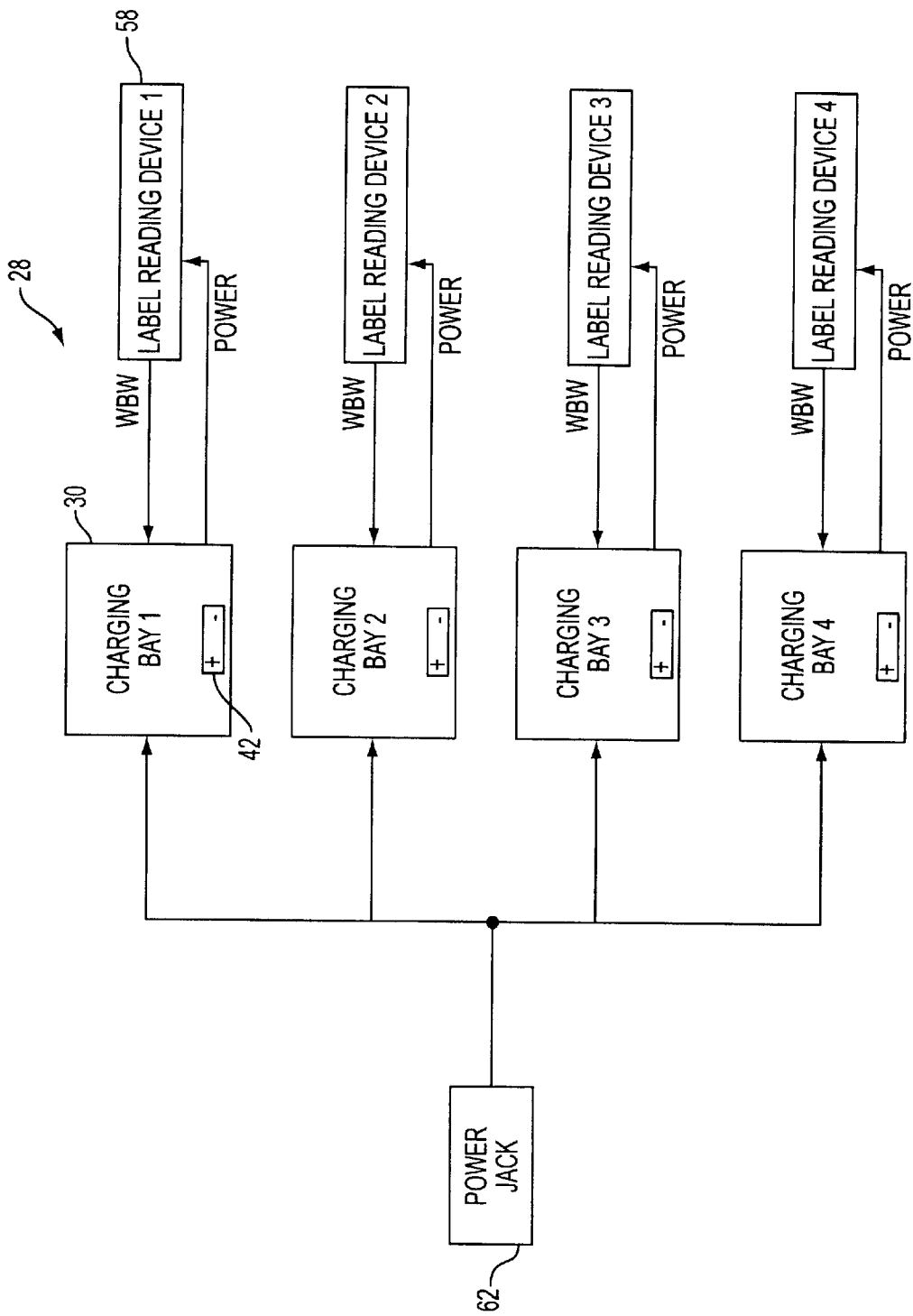
FIG. 10 shows a block diagram of a battery charging system according to the reflective strip embodiment of the present invention that can be used with the battery charger of FIG. 8.

FIG. 10 illustrates a block diagram of electronics housed in housing 28 according to one embodiment of the present invention shown in FIG. 8. Charging bays 34 and label reading devices 58 are powered by power jack 62. Upon insertion of a battery pack 14 into a charging bay 34, the contact points of the battery pack 14 make electrical contact with battery contact area 42. Label reader 58 then "reads" the label on the battery pack 14. Based on the information read from the label 16, label reader 58 selectively asserts the WBW signal and provides the WBW signal to the corresponding charging bay 34.

The label reader 58 can include, but is not limited to, an emitter and detector combination, a magnetic strip reading device, an RF tag interrogator device, or a bar code scanning device. Each of these examples are described in greater detail hereinafter. Label reader 58 is positioned in the housing 28 to read information contained in the label 16 of the battery pack 14. Based on this data, charging dock 30 determines the battery type and charging parameters of battery pack 14. Charging dock 30 then adopts its charging parameters according to the battery type identified.

Magnetic Strip Embodiment

According to a magnetic strip embodiment of the present invention, label 16 includes a magnetic strip, and the label reader 58 includes a magnetic strip reader for reading the magnetic strip. Discriminator 74 of FIG. 1 or decoder 70 can include a magnetic strip decoder for decoding the information read from magnetic strip. For example, information regarding the battery pack type and charge parameters can be encoded in the magnetic strip. Decoder can also include a PC containing magnetic strip decoding software.

RF Tag Embodiment

According to a second embodiment of the present invention label 16 includes an RF tag, and label reader 58 includes an RF tag interrogator for reading the tag. RF tag interrogator can include an RF transmitter and RF receiver for communicating with RF tag and reading information therefrom. Discriminator 74 of FIG. 1 or decoder 70 can include an RF tag decoder for decoding the information read from RF tag. Decoder can also include a PC containing magnetic strip decoding software.

Bar Code Embodiment

In a third embodiment of the present invention label 16 includes a bar code. Accordingly, label reader 58 includes a bar code scanner for reading the bar code. Bar code scanner can utilize, for example, a CCD or laser. Discriminator 74 also includes a decoder for decoding the information read from the bar code. Decoder can be implemented with, for example, a bar code terminal Model T2461 available from Intermec Technologies Corporation of Everett, Washington. When configured in accordance to FIG. 2, decoder can be implemented in decoder 70 and include a personal computer (PC) that is configured to execute bar code decoding software.

Reflective Strip Embodiment

FIG. 10 shows a block diagram of a charger housing 28 that includes four separate battery charging docks or bays 30 operatively coupled to a power jack 62 for receiving power. As will be explained hereinafter, each charging dock 30 is coupled to an associated label reader 58.

In this embodiment, label 16 includes a reflective strip. The reflective strip has three separate sections of reflectivity (white) and non-reflectivity (black).

In this embodiment, battery pack 14 is a 068537 battery pack and the reflective strip to identify it as such has two sections of reflectivity and a non-reflectivity section in between thereof. Thus, the reflective strip comprises white-black-white sections ("WBW"). For these high voltage batteries, a label reader 58 detects an active (logic "1") WBW signal.

Label reader 58 reads the pattern from the reflective strip and includes three separate emitter and detector combinations where each pair reads one of the three separate sections of reflectivity and non-reflectivity. The emitter detector combination is positioned in the charger housing 28 so that when battery pack 14 is operationally coupled to charging dock 30, label reader 58 can read label 16. In this example, there are three pairs of emitter and detector sensors for each charging dock 30. It is to be appreciated that the number of emitter-detector combinations can be adjusted to the number of sections on the reflective strip.

The emitters, such as IR emitters (LEDs), send signals to the reflective strip and the detectors, such as IR reflective sensors, detect the signals reflected off of the sections of reflectivity. Signals from the reflective sections are higher than those from the non-reflective sections. The detectors thus "read" the pattern of the sections.

For instance, if no battery is coupled to charging dock 30, no light is detected by the detectors and therefore charger 78 does not charge battery pack 14 because no charging parameters are received from discriminator 74. However, if battery pack 14 having a reflective strip is coupled to charging dock 30, light reflected off of the reflective strip will be detected by the three separate detectors, and according to the sections of reflectivity and non-reflectivity, discriminator 74 causes the appropriate charging parameters, such as battery voltage and current, to be sent to charger 78 to charge battery pack 14. For example, if a WBW signal is detected, the battery is identified as a first type of battery pack (e.g., a 068537-type battery pack), and charged with charging parameters appropriate for the first type of battery packs (e.g., charging parameters of the 068537 type battery packs).

Figure 11:
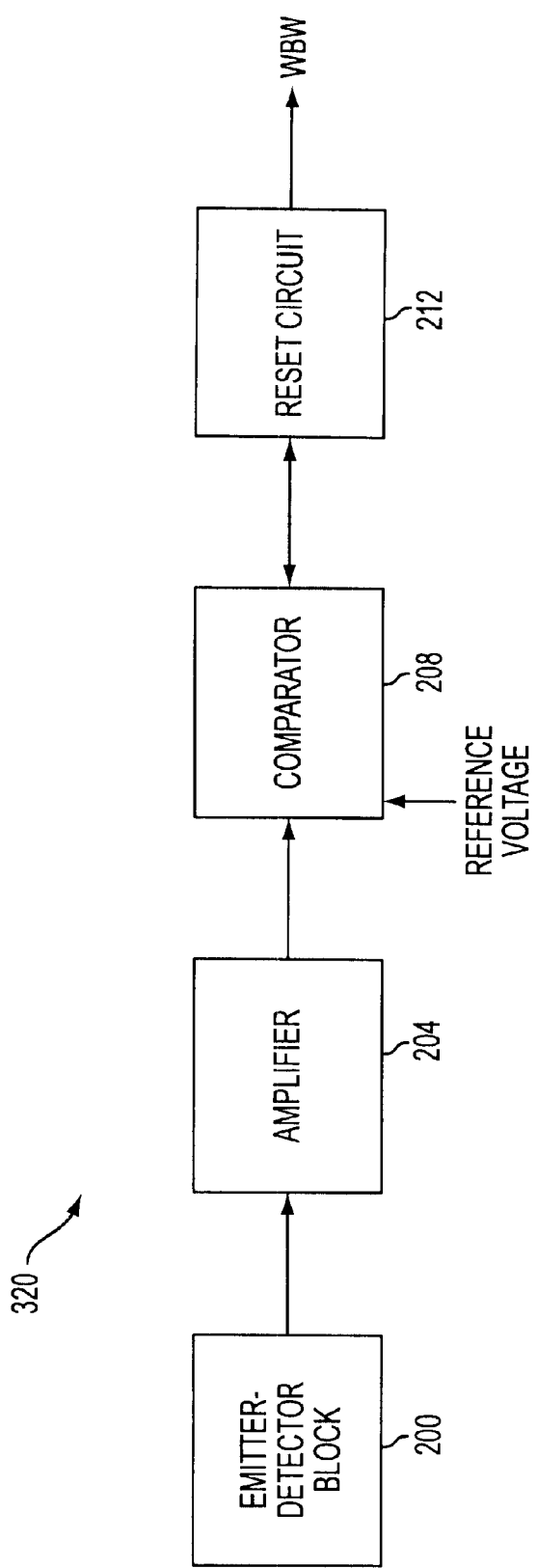
FIG. 11 is a block diagram of a label sensor according to the reflective strip embodiment of the present invention that can be used with the battery charger of FIG. 8.
Figure 12:
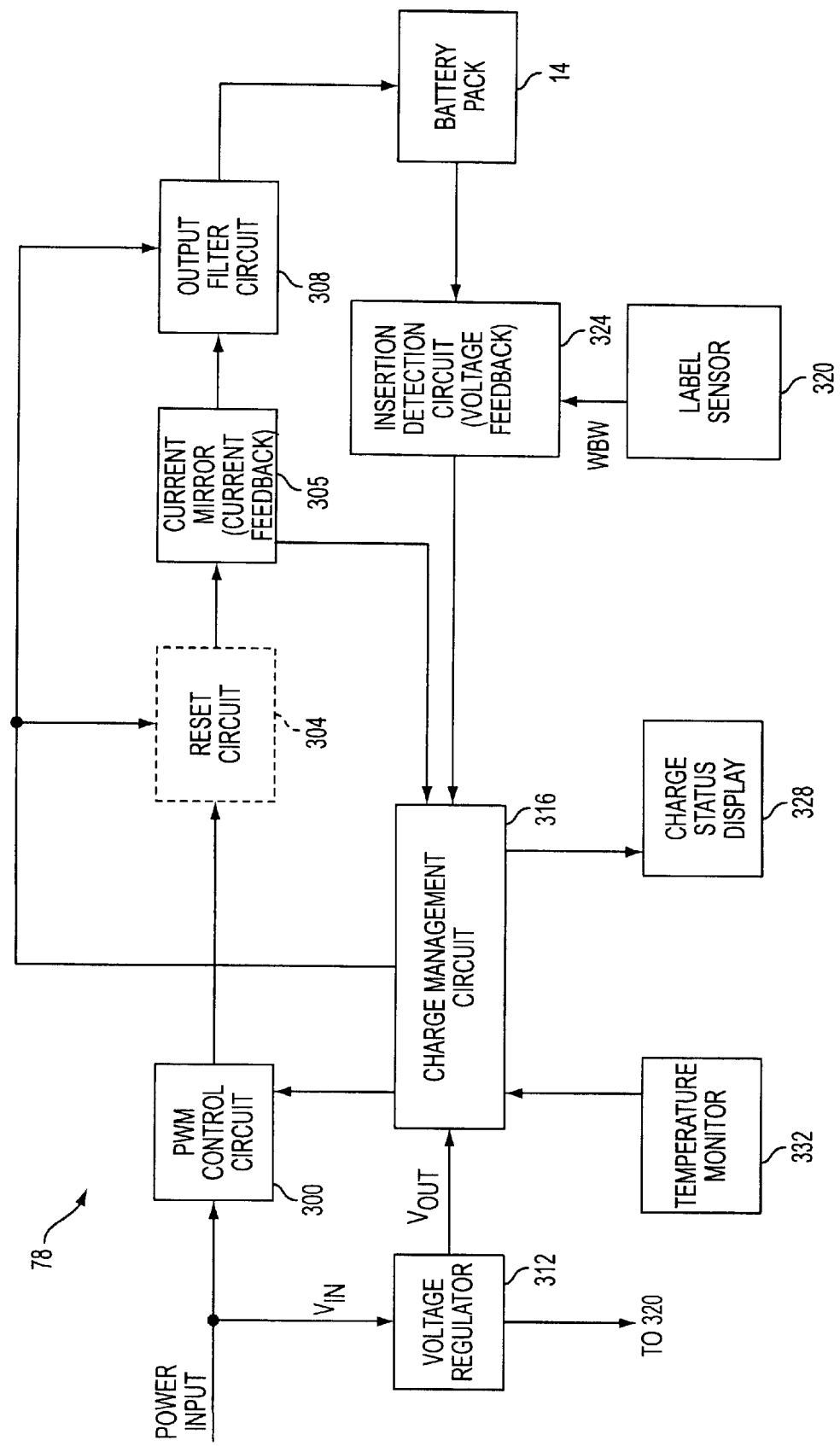
FIG. 12 shows is block diagram of a charger according to the reflective strip embodiment of the present invention that can be used with the battery charger of FIG. 8.
Figure 13:
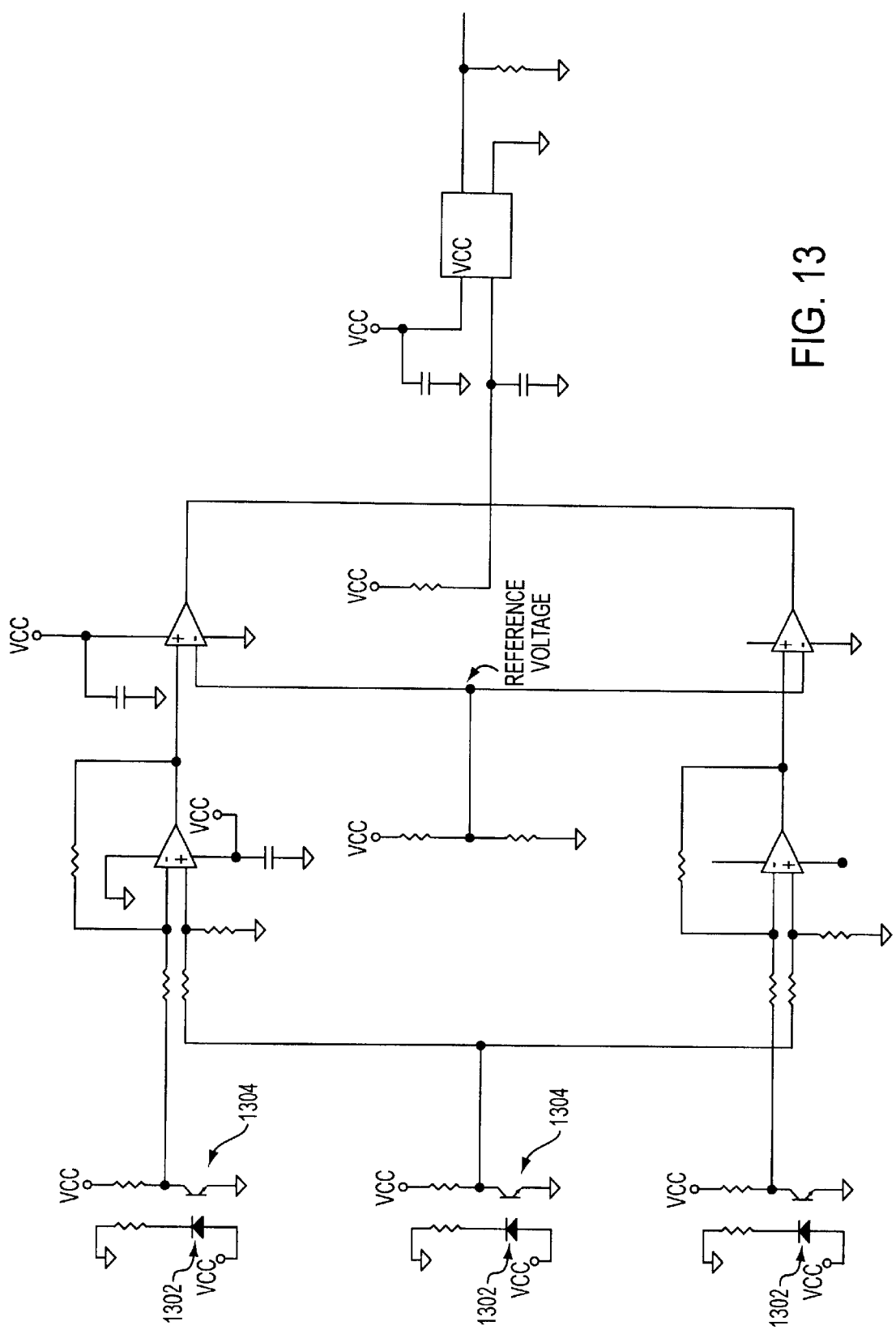
FIG. 13 is a circuit diagram illustrating in greater detail the label sensor of FIG. 11.

FIGS. 11 and 12 illustrate block diagrams of a label sensor and charger, respectively, that can be used for the battery charger of FIG. 8. FIGS. 13 and 14 illustrate non-limiting examples of circuit implementations of the block diagrams shown in FIG. 11 and 12, respectively.

Referring to FIG. 11, the label sensor 320, which can be implemented in the label reader 58, detects the sections of reflectivity and non-reflectivity on the label 16 and generates the WBW signal based thereon. The WBW signal is utilized by the charger of FIG. 12 to identify whether the inserted battery pack 14 is a first type of battery pack or a second type of battery pack (e.g., distinguishing between 068537 and 063278 battery packs). Emitter-detector 200 comprises three separate emitter and detector sensor combinations located in the charging bay 30 which read the data from the labels 16.

Referring to FIG. 13, detectors 1304, which can be IR reflective sensors detect IR signals generated by IR emitters 1302, which can be light emitting diodes (LEDs). The output of emitter-detector 200 is shown coupled to the input of an amplifier 204. Amplifier 204 may be, for example, a CMOS dual amplifier (U4A,U4B). Amplifier 204 measures the difference between the signal reflected from the left section of the label 16 and the signal reflected from the middle section and also measures the difference between the signal reflected from the middle section and the signal reflected from the right section of the label 16. Amplifier 204 then amplifies these differences.

A comparator 208 is coupled to the output of the amplifier 204 to compare the output of amplifier 204 with a predetermined reference voltage, which can be established by a voltage divider (e.g., the voltage divider consisting of resistors R33 and R38 in FIG. 13). The reference voltage can be adjusted to set the sensitivity of the contrast between black and white sections on label 16 to suit a particular application. Comparator 208 can be implemented with dual comparators (e.g., comparators U5A, U5B). The output from comparator 208 is a digital signal (i.e., logic "1" or "0").

Finally, a reset circuit 212 is coupled to the comparator 208 and functions as a buffer for the label sensor 320. Referring to FIG. 13, the reset circuit can be implemented with a voltage monitor circuit (U6). The reset circuit 212 is coupled to the output of the comparator 208 and detects questionable input signals, such as a low voltage signal or any unknown state of the input signal. When the reset circuit 212 detects a questionable input during "power on", the reset circuit 212 sets the WBW signal to a safe state (e.g., logic 0).

FIG. 12 shows a block diagram of a battery charger 78 according to one embodiment of the present invention. The battery charger 78 includes a charge management integrated circuit (IC) 316. It is preferable that charge management IC 316 utilize a flexible pulse-width modulation (PWM) regulator to control voltage and current during charging.

In a non-limiting example, the charge management IC 316 can be implemented with the bq2954 Li-Ion Charge-Management IC available from Unitrode Corporation of Merrimack, New Hampshire. The bq2954 combines the power supply and charge termination control into a single integrated circuit and is suitable for charging of Li-Ion batteries. For safety, the bq2954 inhibits fast charging until the battery voltage and temperature are within configured limits. If the battery voltage is less than the low-voltage threshold, the bq2954 provides low-current conditioning of the battery. The bq2954 charges a battery in two phases. First, a constant-current phase replenishes approximately 70% of battery capacity. Then, a voltage-regulation phase completes the battery charge.

It is noted that for N emitter/detector pairs there can be $2^N$ control signals. These control signals can be utilized for selectively modifying a resistor network or other circuit network that in turn applies a different voltage to the charge management IC 316. For example, a plurality of resistors in series with a switch coupled in parallel to each respective resistor can be used. In such a configuration, each switch is controlled by a respective control signal to selectively short each of the resistors, thereby changing the voltage signal provided to the charge management IC 316.

The pin definitions for the bq2954 are as follows: Pin 1, the TM input, is the time-out programming input which can be utilized to set the maximum charge time. Pin 2, the CHG output, is the charge active output. An open-drain output is driven low when the battery is removed, when a fault condition is present, or when charging is completed. Pin 3, the BAT input, is the battery voltage input or the sense input. Pin 4, the VCOMP input, is the voltage loop compensation input to stabilize the regulated voltage. Pin 5, the ICOMP input, is the current loop compensation input to stabilize the regulated current. Pin 6, the ITERM input, is the charge full and minimum current termination select input. Pin 7, the SNS input, is the charging current sense input. Battery current is sensed via the voltage developed on this pin by an external sense-resistor.

Pin 8, the TS input, or the temperature sense input monitors the battery temperature. Pin 9, the TPWM input, is the regulation timebase input. Pin 10, the BTST output, is the battery test output. The BTST output is driven high in the absence of a battery in order to provide a potential at the battery terminal when no battery is present. Pin 11, the LCOM output, is the common LED output. Pin 12 is the system ground pin (e.g., $V_{SS}$). Pin 13 is the $V_{CC}$ supply pin. Pin 14, the MOD output, is the modulation control output. The MOD output is used to control the charging current to the battery. MOD switches high to enable current flow and low to inhibit current flow. Pin 15 or LED$_1$/CSEL is the charge status output 1 and charge sense select input. LED$_1$ is the driver for the direct drive of the LED display. The CSEL input controls whether current is sensed on low side of battery or high side of battery. A current mirror is required for high-side sense. Pin 16 or LED$_2$/DSEL is the charge status output 2 and display select input. The DSEL input controls the LED$_{1-2}$ charge display modes.

Referring back to FIGS. 12 and 14, charge management IC 316 is coupled to PWM control circuit 300, reset circuit 304, output filter circuit 308, voltage regulator 312, insertion detection circuit 324, charge status display 328, temperature monitor 332, and current mirror 305.

Voltage regulator 312 includes a $V_{IN}$ input for receiving a first voltage, such as 12V, and a $V_{OUT}$ output for providing a second voltage, such as 5V. Second voltage is provided to the other integrated circuits illustrated in FIGS. 13 and 14, such as the $V_{CC}$ input of charge management circuit 316.

PWM control circuit 300 functions to control the voltage and current during charging. The PWM control circuit 300 includes three transistors (Q1, Q3, and Q7), two diodes (D4 and D5), two inductors (L1 and L2), a capacitor C4, and three resistors (R3, R5, and R18). The PWM control circuit 300 is coupled to charge management circuit 316, reset circuit 304 and voltage regulator 312 and is powered by the power input. The frequency of the PWM control circuit 300 can be set by an external capacitor.

Referring to FIG. 13, charge management circuit 316 regulates both constant current and constant voltage through its MOD output. The MOD output is connected to the base of transistor Q7. Charge current is monitored at the SNS pin, and charge voltage is monitored at the BAT pin. These voltages are compared to an internal reference, and the MOD output is modulated to maintain the desired value.

In regards to the insertion detection circuit 324, the WBW signal from label sensor 320 is input to insertion detection circuit 324. The insertion detection circuit 324 detects the presence or absence of a battery in the charging bay by measuring the voltage on the battery and can include two transistors (Q2 and Q8) and four resistors (R1, R7, R9, and R9). The insertion detection circuit 324 is coupled to battery pack 14 by the "+" and "−" terminals, and the BTST pin of charge management circuit 316. The BTST pin is driven high to provide a potential at the battery terminal when there is no battery pack 14 present. This is the case when the battery pack 14 is fully depleted (i.e., it has no voltage, or it is a self-protected battery pack). A low current, supplied by the BTST pin, is required to revive the battery pack 14 to bring the voltage on the battery pack 14 to a threshold level. This threshold level allows charge management circuit 316 to detect whether a battery pack 14 is in the charging bay.

The presence or absence of a battery pack 14 is detected by the sense input (BAT) of charge management circuit 316. The sense input (BAT) is connected to a high-impedance resistor divider network (R17, R20, R26) connected between the positive and the negative terminals of the battery pack 14. A potential is developed using this high-impedance resistor divider network.

The reset circuit 304 is provided for discharging the capacitances on the current path when the battery pack 14 is removed in order to prevent false measurements. Reset circuit 304 is coupled to PWM control circuit 300, charge management circuit 316, and current mirror 305, and includes transistor Q4, diode D2, capacitor C3, and four resistors (R4, R6, R8, and R11).

The output filter circuit 308 is coupled to the charge management circuit 316, reset circuit 304, current mirror 305, and battery pack 14. Output filter circuit 308 includes two transistors (Q5 and Q6), capacitor C7, and two resistors (R13 and R14). Output filter circuit 308 filters the voltage signal from the battery. At the output of the PWM control circuit 300, the power signal is fairly noisy, therefore in order to measure the voltage on the battery, the signal needs to be filtered.

In a situation where the user removes the battery pack 14 from the charging dock 30, the charge management circuit 316 detects some fluctuation in the battery voltage because capacitor C7 is storing a lower level voltage than the voltage in the removed battery pack 14. At this point, the capacitor C7 is removed so that charge management circuit 316 can determine that a battery pack 14 has been removed.

Current mirror 305 measures the voltage drop across shunt resistor R2 to determine the current supplied to battery pack 14. Current mirror 305 is coupled to charge management circuit 316, reset circuit 304, and output filter circuit 308. Referring to FIG. 14, current mirror 305 can be implemented with transistor U1, and resistors R2, R6, R10, and R12.

Charge status display 328 is coupled to charge management circuit 316 and displays the charging status of the battery. Charge management circuit 316 provides two output signals (LED1 and LED2) for indicating charge status. Charge status display 328 can include a yellow light emitting diode (LED) having a first terminal and a second terminal, and a green LED having a first terminal and a second terminal. The first terminal of a yellow light emitting diode (LED) and a first terminal of a green LED can be coupled to receive the LED1 and LED2 signals, respectively. The second terminals of the yellow and green LEDs can be coupled to the LCOM input of charge management circuit 316.

The different yellow and green LED patterns and combinations indicate different states of operation. During charging, the green LED is OFF, and the yellow LED is ON. When charging is completed, the green LED is ON, and the yellow LED is OFF. When the temperature is out of specification, the green LED is OFF, and the yellow LED blinks. When there is no battery, both the green and yellow LEDs are OFF.

Temperature monitor 332 is coupled to charge management circuit 316 and, in this example, measures or monitors the ambient temperature in the charging dock 30 and provides this information to charge management circuit 316. Charge management circuit 316 suspends charging until the temperature falls below a predetermined threshold temperature or within an allowable range of temperatures. In other applications where the batteries themselves are accessible to temperature probes, temperature monitor 332 can be used to measure the temperature of the batteries themselves, and the battery temperature can be utilized as a condition to terminate battery pack charging.

As disclosed, the present invention provides a battery charging system which accepts different battery packs, discriminates between these different battery packs, and adapts the charging parameters according to the type of battery pack detected. In the foregoing specification, the present invention has been described with reference to specific embodiments thereof It will, however, be evident that various modifications and changes can be made thereto without departing from the broader spirit and scope of the invention as set forth in the appended claims. For example, when mechanical keys are used to differentiate the battery packs, label reader 58 is not needed, and the discriminator 74 can be configured to detect the physical differences between the battery packs and generate a charge control signal based thereon.

The specification and drawings are, accordingly, to be regarded in an illustrative rather than a restricted sense. Therefore, the scope of the invention should be limited only by the appended claims.

What is claimed is:

1. A battery charging system for determining battery type and charging parameters of a plurality of different battery pack types and adopting its charging parameters accordingly, said battery charging system comprising:
    a battery pack having a first terminal, a second terminal, and a label; and
    a charging dock for receiving the battery pack, said charging dock having a first terminal for contacting the first terminal of the battery pack when battery pack is operationally coupled to the charging dock;
    a second terminal for contacting the second terminal of the battery pack when battery pack is operationally coupled to the charging dock;
    a label reader for reading the label when the battery pack is operationally coupled to the charging dock;
    a discriminator, coupled to the label reader, for receiving information from the label reader and based thereon for generating at least one charge control signal; and
    a charger, coupled to the discriminator, for receiving the charge control signal and charging the battery pack based on the charge control signal.

2. The battery charging system of claim 1 wherein the discriminator reads information from the label, decodes the information, and generates at least one charge control signal based on the decoded information.

3. The battery charging system of claim 1 further comprising:
    a decoder coupled to the label reader for receiving information from the label reader and decoding the information to provide decoded information; and
    a communication circuit coupled to the label reader to receive information from the label reader, the communication circuit coupled to the decoder for providing information to the decoder and for receiving decoded information therefrom, and coupled to the discriminator for providing decoded information thereto.

4. The battery charging system of claim 1 wherein said charger changes at least one battery charging parameter based on the charge control signal to charge said battery pack.

5. The battery charging system of claim 4 wherein the battery charging parameters are selected from the group consisting essentially of charge voltage, charge current, temperature, charge capacity, and charging methods.

6. The battery charging system of claim 4 wherein said charger affects the charge voltage and the charge current provided to the first and second terminals of the charging dock and adjusts the charge time based on the charge control signal.

7. The battery charging system of claim 1 wherein said label includes a magnetic strip, said label reader is a magnetic strip reader, and wherein said discriminator includes a magnetic strip decoder for decoding information read from the magnetic strip.

8. The battery charging system of claim 1 wherein said label includes an RF tag, said label reader is a RF tag interrogator device, and wherein said discriminator includes a decoder for decoding information read from the RF tag.

9. The battery charging system of claim 1 wherein said charging dock includes at least one contact position reader, and where the battery pack includes a first contact having one of a first position and a second position, with the contact position reader providing at least one charge control signal when said battery is inserted in charging dock based on the position of the first contact.

10. A battery charging system, comprising:
  a) a battery pack having at least one of a plurality of batteries; the plurality of batteries including batteries of a first battery type and batteries of a second battery type, the batteries of the first battery type having charging parameters that are different from the batteries of the second battery type; and
  b) a charging dock for receiving the battery pack, the charging dock including a battery charger for charging the at least one of a plurality of batteries, the battery charger further including a battery discriminator for identifying whether the at least one of a plurality of batteries is of the first battery type or of the second battery type, the battery type identifying being a function of a reflective feature of the battery pack;
  wherein the reflective feature has at least one reflective section having a width; wherein information is encoded in the section by modifying the level of reflectivity of the section and wherein the encoded information is independent of the width of the reflective section;
  wherein the battery charger charges the one of a plurality of batteries in accordance with the identification of the battery type determined by the battery discriminator.

11. The system as in claim 10 wherein the reflective feature further comprises:
  a plurality of reflective sections; wherein each reflective section has substantially the same width as the other sections.

12. The system as in claim 10 wherein the battery back has a housing; wherein the reflective section is one of printed on the housing of the battery pack, formed integrally with the housing of the battery pack, and formed on a label that is physically affixed to the housing of the battery pack.

13. The system as in claim 10 wherein a battery type identifier is encoded in the level of reflectivity of the reflective region.

14. The system as in claim 10 wherein the battery discriminator includes a photo emitter and photo detector for each reflective region; wherein the photo emitter and photo detector are utilized for reading the respective reflective region.

15. The system as in claim 10 wherein each reflective region represents a single bit of information.

16. A method for charging a battery pack comprising the steps of:
  coupling the battery pack to a charging dock, the charging dock being adapted to charge at least one battery of the battery pack, the at least one battery being any one of a plurality of battery types having different charging parameters, the at least one battery being housed in a battery pack, the battery pack being any one of a plurality of types of battery packs corresponding to the plurality of battery types;
  using the charging dock to discriminate the type of the at least one battery from the plurality of battery types based on the type of battery pack, wherein the charging dock discriminates the type of the at least one battery based on a signal received from the battery pack corresponding to a reflective feature of the battery pack, the signal being representative of the type of the at least one battery; and
  charging the at least one battery according to the determined type of the at least one battery;
  wherein the reflective feature has at least one reflective section having a width; wherein information is encoded in the section by modifying the level of reflectivity of the section and wherein the encoded information is independent of the width of the reflective section.

* * * * *

UNITED STATES PATENT AND TRADEMARK OFFICE
Certificate

Patent No. 6,236,186 B1                                                      Patented: May 22, 2001

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Patrick Helton, Marysville, WA; David Nierescher, Renton, WA; Kevin James Talbot, Mercer Island, WA; Claudiu Bulai, Redmond, WA.

Signed and Sealed this Eleventh Day of March 2003.

*MICHAEL J. SHERRY*
*Supervisory Patent Examiner*
*Art Unit 2838*